United States Patent [19]

Vetter et al.

[11] Patent Number: 5,548,033

[45] Date of Patent: Aug. 20, 1996

[54] PROCESS FOR THE SHORT-TIME TREATMENT OF A PLASTIC MELT WITH A LIQUID TREATMENT AGENT AND THE PLASTIC THUS PRODUCED

[75] Inventors: Heinz Vetter, Rossdorf; Werner Hoess, Heusenstamm; Joachim Dutschke, Bensheim; Hartmut Schikowsky, Darmstadt, all of Germany

[73] Assignee: Roehm GmbH Chemische Fabrik, Darmstadt, Germany

[21] Appl. No.: 379,999

[22] Filed: Jan. 27, 1995

[30] Foreign Application Priority Data

Jan. 29, 1994 [DE] Germany .................... 44 02 666.8

[51] Int. Cl.$^6$ ...................................................... C08F 8/32
[52] U.S. Cl. ................ 525/378; 525/327.6; 525/330.5; 525/379
[58] Field of Search ............................ 525/378, 379

[56] References Cited

U.S. PATENT DOCUMENTS

| | | | |
|---|---|---|---|
| 4,246,374 | 1/1981 | Kopchik | 515/378 |
| 4,746,478 | 5/1988 | Fujisaki et al. | |

FOREIGN PATENT DOCUMENTS

| | | |
|---|---|---|
| 0163865 | 12/1985 | European Pat. Off. . |
| 0216505 | 4/1987 | European Pat. Off. . |
| 0219334 | 4/1987 | European Pat. Off. . |
| 0234726 | 9/1987 | European Pat. Off. . |
| 0234074 | 9/1987 | European Pat. Off. . |
| 0340873 | 11/1989 | European Pat. Off. . |
| 0376747 | 7/1990 | European Pat. Off. . |
| 0376748 | 7/1990 | European Pat. Off. . |
| 0463759 | 1/1992 | European Pat. Off. . |
| 0570135 | 11/1993 | European Pat. Off. . |
| 2652118 | 6/1977 | Germany . |
| 3624909 | 1/1987 | Germany . |
| 3806147 | 9/1988 | Germany . |
| 3819605 | 10/1989 | Germany . |
| 3842796 | 6/1990 | Germany . |
| 930339 | 7/1963 | United Kingdom . |
| 1475216 | 6/1977 | United Kingdom . |
| 2101139 | 1/1983 | United Kingdom . |
| 2216843 | 10/1989 | United Kingdom . |

OTHER PUBLICATIONS

Research Disclosure, No. 321, Jan. 1991, M. P. Hallden-Abberton, et al., "Control of Functionality in Glutarimide Polymers", 2 pages.

*Primary Examiner*—Bernard Lipman
*Attorney, Agent, or Firm*—Oblon, Spivak, McClelland, Maier, & Neustadt, P.C.

[57] ABSTRACT

A plastic melt is treated for a short-time with a liquid treatment agent under pressure, it is divided into defined subquantities, individual subquantities are brought into contact with a treatment agent and combined for a residence time of less than one second with portions of at least one other subquantity, and portions of the mixture thus formed are separated and combined with another subquantity; the steps of dividing and combining the mixture are repeated several times at intervals of less than one second until an intimate mixture of the plastic melt and the treatment agent has formed, allowing the preparation of especially homogeneously structured thermoplastic materials, e.g., poly(methacrylalkylimide) plastics, which are compatible with poly(methyl methacrylate).

15 Claims, No Drawings

PROCESS FOR THE SHORT-TIME TREATMENT OF A PLASTIC MELT WITH A LIQUID TREATMENT AGENT AND THE PLASTIC THUS PRODUCED

BACKGROUND OF THE INVENTION

1. Field of the Invention

The subject matter of this invention concerns a process for the short-time treatment of plastic melt with a liquid treatment agent at a pressure and temperature at which the treatment agent is in the liquid state, with the mixture being subsequently expanded and subjected to degassing at a reduced pressure. The subject matter of this invention also concerns transparent thermoplastic materials which contain a poly(methacrylimide) plastic or transparent polymer mixtures produced therefrom with poly(methyl methacrylate).

2. Discussion of the Prior Art

A treatment process of the type mentioned above is employed, for example, to convert poly(methyl methacrylate) into poly(methacrylimide) plastics. According to the German Patent DE-C 2,652,118, poly(methyl methacrylate) is melted in an extruder, and ammonia or a primary amine is incorporated into the melt using pressure. These treatment agents, in combination with the polymerized units of methyl methacrylate, are converted into cyclic glutarimide units of the formula:

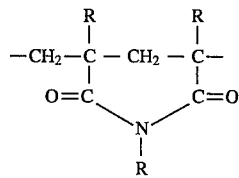

in which R preferably stands for a hydrogen atom or a methyl group. In the course of this reaction, methanol is cleaved off and subsequently withdrawn from the extruder by evaporation under reduced pressure in the degassing zone of the extruder. The degree of this reaction, which is known as imidization, depends on the molar ratio between the ammonia or amine and the simultaneously present units of methyl methacrylate. With an excess of ammonia or amine, a considerable or complete imidization is obtained, while with substoichiometric quantities, a partial imidization is achieved. At the same time, units of methacrylic acid or methacrylic acid anhydride form.

It is known from the European Patent EP-A 216,505 that the partially imidized polymers are incompatible with one another as well as with poly(methyl methacrylate) and that they form turbid (opaque) mixtures. Even unmixed poly(methacrylimide) plastics are sometimes turbid, which indicates that they contain incompatible polymer constituents. According to the European Patent EP-A 376,748, the cause for this turbidity is to be seen in the distribution range of the degree of imidization which is more than 5%. Transparent poly(methacrylimide) plastics with a distribution range below 5% are obtained if the imidization is carried out in a solution of poly(methyl methacrylate) in an organic solvent, such as toluene. It is possible to achieve degrees of imidization of, for example, 75% to 80%. The drawback of this process is that the solvent must be evaporated after the reaction and must be separated from the cleaved methanol and the unreacted amine.

There are several processes in which melts of thermoplastic materials are mixed under pressure with highly liquid treatment agent. According to the German Patent DE-A 3,624,909, a liquid blowing agent is incorporated into a plastic melt, the mixture is cooled and expanded in the thermoelastic state to form a foamed plastic. In order to mix the components, the melt viscosities of which differ widely, a special mixing device is used, which is connected to an extruder. The mixing device is equipped with a rotor which is supported in a stator in such a way that a gap is formed, through which the mixture consisting of a blowing agent and thermoplastic materials can pass while the rotor is turning. The outside surface of the rotor and the inside surface of the stator are fitted with cavities that are arranged so as to overlap one another during the rotation of the rotor, thus causing the mixture consisting of the blowing agent and the thermoplastic materials to be transferred from one cavity to the next while the mixture passes through the mixing device.

DESCRIPTION OF THE INVENTION

The inventors discovered that the turbidity of partially imidized poly(methyl methacrylate) or mixtures thereof with untreated poly(methyl methacrylate) is due to constituents of more highly imidized material which is incompatible with the less imidized or completely non-imidized material and which separates and forms separate phase in the mixture. The formation of more highly imidized quantities during the reaction of a poly(methyl methacrylate) melt with ammonia or an amine in the extruder is apparently due to the rapid reaction. The ammonia or amine, which has been incorporated into the melt, reacts more rapidly with the methyl methacrylate units that are available in the immediate vicinity than it is being dispersed in the melt. The only effect by subsequently intermixing the melt is that the highly imidized constituents, which form at the point of incorporation, are finely dispersed in the insignificantly or completely unreacted polymer material, yet continue to exist as a separate phase and cause light scattering.

Similar problems can be observed during the devolatilisation of residual monomers from thermoplastic melts. A successful method of reducing the content of residual monomers in the melt provides for the incorporation of a small quantity of water into the melt. During the subsequent devolatilisation, the water evaporates and carries off the monomer vapors. During the devolatilisation of poly(methyl methacrylate) and other polymers with hydrolyzable groups, however, there is a risk that at the incorporation site a relatively high water concentration is present, which leads to hydrolysis. Thus, it is possible for incompatible, partially hydrolyzed polymer constituents to form, which lead to turbidity or corrosion.

SUMMARY OF THE INVENTION

Thus, it is one object of this invention to prevent the undesirable formation of inhomogeneities and incompatibilities during the short-time treatment of a plastic melt with a liquid treatment agent at a pressure and temperature, at which the treatment agent is in the liquid state, and to influence the conditions as rapidly and uniformly as possible to ensure that the desired result is obtained by the time degassing takes place.

It was found that this objective can be reached by dividing the plastic melt into defined subquantities, by bringing such individual subquantities into contact with the treatment agent and by combining them over a residence time of less than one second with portions of at least one other defined subquantity and by separating portions from the thus formed mixture and combining them with another defined subquantity and by repeating the steps of separating and combining the defined subquantities of the plastic melt several times at intervals of less than one second until an intimate mixture consisting of the plastic melt and the treatment agent is obtained.

By dividing the melt into several small individual portions and by combining the subquantities with the treatment agent, the treatment agent is rapidly dispersed in the melt, thus ensuring that the treatments lead to a homogeneous product. The mechanical dispersion of the melt, of course, does not reach the level of molecular dispersion, such as is achieved for a polymer solution according to European Patent EP-A 376,748. It is therefore surprising that the mechanical division and combination leads to a comparably successful result.

Although the process claimed by this invention can be applied to many different treatment processes, it is of particular importance in those cases, in which the treatment agent as such or a secondary product, which is released during the treatment, is volatile and can thus be drawn off during the subsequent degasification. Even highly liquid treatment agents, the incorporation of which into a plastic melt can normally be achieved only with difficulty, can be used in the process according to this invention. Under the pressure and temperature conditions used, the treatment agent should be liquid or at least within the range of the supercritical state.

The treatment agent may be reactive with respect to the plastic. An important practical example is the partial reaction of poly(methyl methacrylate) with ammonia or amines to form methyl methacrylate/methacrylimide copolymers. A case, in which it is undesirable for the treatment agent to be reactive with respect to the plastic, is the devolatilisation of the carrier agent, i.e., the removal of the residual monomers by means of water from poly(methyl methacrylate) or other polymers with carboxylic ester groups.

DETAILED DESCRIPTION OF THE INVENTION

The process of this invention is preferably carried out by subjecting the plastic melt in the extruder to pressure and by introducing the melt into a mixing device which is equipped with a stator and a rotor. Between the stator and the rotor, a narrow gap is located. The treatment agent is introduced into the mixing device under at least equal pressure. The inside surface of the stator and the outside surface of the rotor are fitted with cavities for holding defined subquantities of the plastic melt. During the rotation of the rotor in the stator, the cavities of the rotor and stator overlap one another for a short period of time in such a way that under the prevailing pressure, portions of the subquantities of melt, which are mixed with the treatment agent, are separated from each cavity and are exchanged between the cavities of the rotor and stator, as a result of which the separated portions enter the cavities that are located further downstream. Thus, in any given overlapping phase, a portion of the subquantity in one cavity of the rotor enters a cavity of the stator which is located further downstream while at the other end of this cavity, an equally large portion of the melt is simultaneously transferred into a cavity of the rotor. As the rotation proceeds, the transfer of the melt stops whenever one overlapping phase is concluded and starts again in the direction of rotation, as soon as a new overlapping phase involving the next cavity starts. Whenever one cavity on one wall surface between the rotor and the stator is able to overlap several cavities on the other wall surface, the flow of melt is divided into further branches.

Devices with the above-described basic mechanisms are known as "cavity transfer mixers" and have been previously described in the British Patent Specifications 930,339 and 1,475,216. Improvements thereof have been described in the German Patent Specifications DE-C 3,806,147 and 3,819,605. A detailed description of the mechanism of the mixing action can be found in the U.S. Pat. No. 4,419,014. A thorough investigation of the mixing effect was published by F. Hensen (Intern. Polymer Processing IV, 1989, p. 2), M. Gale, K. Storton, E. de Jong, D. South, S. Dominey, R. Hindmarch (information brochure of Rapra Technology Ltd., Shawbury, Shrewsbury, Shropshire SY4 4NR, UK, of Nov. 15, 1988). These mixers are used predominantly for mixing thermoplastic materials with one another or with rubber materials, but also with other additives, such as pigments, fillers, lubricants, stabilizers, or antistatic agents. In all cases, the mixing procedures used served to effectively incorporate permanent components into a mixture. What was not known, however, was that these mixers make it possible to incorporate treatment agents with low viscosity into a melt, which treatment agents or their reaction products are subsequently removed by devolatilisation.

The residence time, during which an individual subquantity of the mixture consisting of the melt and the treatment agent remains in a cavity of the mixer between two dividing and combining steps, is generally in the range of 0.001 second and 1.0 second, preferably in a range from 0.01 to 0.1 second. After this residence time, the cavities of the rotor have shifted with respect to those of the stator so that it is possible for a new overlapping phase to begin. Thus, under the prevailing pressure, the mixture exits from the cavities of one wall and enters the downstream cavities on the other wall, thereby displacing a portion of the mixture present in these latter-mentioned cavities and pushing it into the downstream cavities of the opposite wall. As a rule, the cavities in the stator and the rotor are positioned in rows along a peripheral line. In each overlapping phase, the mixture enters a row that is located further downstream until at the end of the mixture, the mixture exits from the last row of cavities. The residence time is defined as the interval between two overlapping phases, regardless of the quantity of the transferred portion of the subquantities in the cavities. The alternating cycle of dividing and combining is repeated until the mixture has passed entirely through the mixer. If the stator and rotor contain Y rows with N cavities each, the material flowing into the mixer will be divided $N^{2Y}$ times before it finally exits the mixer (F. Hensen). The residence time between two successive dividing cycles results from the quotient of the residence time in the mixer and the number of dividing steps; as a rule, it is far less than $\frac{1}{1000}$ second.

The size of the subquantities is determined by the volume of the cavities. They should be small enough to ensure that the treatment agent is able to sufficiently penetrate every subquantity and to have the effect desired. Subquantities in the range of 0.001 to 100 mL are desirable; preferably of the range of 0.01 to 50 mL, more preferably in the range of 0.05 to 10 mL.

As a rule, the pressure at the inlet of the mixer is generated by the extruder screw that ends just in front of the inlet and ranges, for example, 100 to 500 bar, preferably from 50 to 400 bar, more preferably from 10 to 250 bar. It is useful to mechanically couple the rotor of the mixer to the extruder screw which then drives the rotor. At the inlet of the mixer, the treatment agent is pressed at least the same pressure, preferably at a slightly higher pressure, through openings in one or several cavities of the first row of cavities. The pressure drop along the mixer up to the outlet of the mixer is generally 5 to 50 bar, thus making the mixture exit from the mixer at a pressure of 5 to 200 bar. It is recommended that this pressure be maintained as constant as possible during continuous operation. This can be achieved by introducing the mixture via a controlled pressure regulating valve into the degassing zone. The control variable used is the pressure prior to entry into the mixer; as this pressure rises, the pressure regulating valve opens wider and vice versa.

The mixture is degassed after a residence time which can be freely chosen and which is determined by the flow rate from the time of exiting the mixer to the entry into the degassing zone. During this time, there is no longer a risk that the mixture is subjected to nonhomogeneous changes. The residence time can be set to be sufficiently long to ensure that the homogeneous reaction desired can take place or it can be set for such a short time that undesired changes are avoided.

Devolatilisation can be suitably carried out in a conventional degassing extruder, in which the mixture is transported into a zone of reduced pressure. Although this degassing extruder can be connected directly to the mixer and can be driven by the same axis, it is preferable for the purpose of a more accurate pressure control in the mixer that the degassing extruder be kept separate from the mixer and that the mixture be introduced from the mixer via a line with the above-mentioned pressure regulating valve into the degassing extruder. In this degassing extruder, a temperature in a range identical to that of the melt is maintained, which temperature as a rule corresponds approximately to that in the mixer. The pressure in the degassing zone depends on the vapor pressure of the component that is to be degassed. At times, it suffices to maintain a pressure in the degassing zone which is slightly lower than that in the mixer. Preferably, degasification is carried out at atmospheric or subatmospheric pressure, optionally in several decremental pressure stages until the final pressure reached is in a range from 1,000 to 100 mbar, preferably from 600 to 50 mbar, more preferably from 400 to 10 mbar. The vapors from the degassing zone are drawn off using conventional methods. In a pumping zone, the pressure of the melt is once again increased, and the melt is subsequently discharged via a nozzle and cooled. In the pumping zone, it is also possible, if desired, to incorporate other plastics or other additives into the melt.

A large variety of thermoplastic materials can be treated according to the process described by this invention. Plastics to be preferred are plastics which can be processed at melt temperatures of 100° C. to 500°, preferably of 180° C. to 320° C. and which have a melt viscosity of 500 to 20,000 Pa.s, preferably of 1,000 to 15,000 Pa.s. Polymers suitable for the present application include, but are not limited to, the thermoplastic polymers produced by polymerization of esters of methacrylic acid with low molecular weight alcohols. Such esters include but are not limited to methyl methacrylate, ethyl methacrylate, propyl methacrylate, butyl methacrylate. In addition, suitable polymers for the present application include esters of acrylic acid with low molecular weight alcohols such as methyl acrylate, ethyl acrylate, propyl acrylate and butyl acrylate. In addition, suitable polymers for the present invention include the copolymers of methacrylate esters with acrylate esters, styrene, α-alkyl substituted styrene, such as α-methyl styrene, ring substituted alkyl styrene, such as 2-methyl styrene, 3-methyl styrene, 4-methyl styrene, di- or tri-alkyl substituted styrenes, such as 2,3-dimethyl styrene, halide substituted styrene such as 2-chloro styrene, 2,5-difluoro styrene, maleic acid anhydride, itaconic acid anhydride and mixtures thereof of such monomers. Poly(methyl methacrylate) is particularly preferred.

The increased homogeneity of the plastics treated by means of the method described by this invention does not only promote the internal compatibility of said plastics but also the miscibility of these plastics with other thermoplastic materials. This has an especially favorable effect during the partial imidation of poly(methyl methacrylate). By means of a reaction with 0.01 to 0.1 mole of ammonia or a primary amine per basic mole of the methyl methacrylate units, methyl methacrylate/methacrylimide copolymers with a degree of imidation of 0.5 to 15% are obtained. Primary aliphatic amines with 1 to 6 carbon atoms, preferably 1 to 3 carbon atoms and especially methylamine, are to be preferred. These are preferably used in the form of a 1 wt. % to 90 wt. % aqueous solution, preferably 5 wt. % to 80 wt. % and more preferably a 10 wt. % to 60 wt. %, the water content of which during degasification has a favorable effect on the removal of residual monomers and other volatile components. In the case where methyl methacrylate is the starting thermoplastic material, preferred thermoplastic materials, which can be prepared according to this invention, have the following copolymer composition:

1–15 wt % of glutarimide units,

1–6 wt % of methacrylic acid units, and 0.5–10 wt % of methacrylic acid anhydride units and the remaining percentage is substantially made up of methyl methacrylate units.

Glutarimide units are defined as the dimethacrylimide groups, the formulas of which were given in the introduction and in which R stands for hydrogen atoms or low alkyl groups, especially one with 1 to 6 C atoms, preferably with 1 to 4 C atoms, more preferably methyl. The Vicat softening temperatures of the reaction products range from 100° C. to 150° C., preferably from 110° C. to 130° C. These products are marked by a high transparency which is measured on the basis of a particularly low turbidity value (haze according to ASTM D 1003) and which, surprisingly, is not lost even when the products are mixed with poly(methyl methacrylate) molding materials, such as polymer mixtures consisting of A) 10 to 90 wt % (relative to the plastic) of a copolymer consisting of 80 to 99 wt % (relative to the copolymer) of methyl methacrylate units and 1 to 15 wt % of glutarimide units and B) 90 to 10 wt % of poly(methyl methacrylate).

Such mixtures have Vicat softening temperatures in a range from 110° C. to 130° C. They can be suitably used in many areas of application, in which so far predominantly poly(methyl methacrylate) had been used, e.g., for light covers of automotive vehicles, but they have the additional advantage of being able to withstand higher heat loads while having an unchanged excellent weathering resistance. The materials of the present invention are also suitable for applications demanding high heat resistance combined with transparency, in which applications more expensive materials have been used in the past, such as hisphenol-A-polycarbonate and tetramethyl bisphenol-A-polycarbonate.

For the purpose of illustration only, the invention will be described in connection with certain preferred embodiments. However, it is recognized that various modifications, changes, additions and improvements may be made in the prefered embodiments without departing from the spirit and scope of the invention.

EXAMPLE 1

The treatment device used is a device which consists of a reaction extruder, a pressure regulating valve that is located downstream thereof, and a degassing extruder with two degassing openings, which are connected to a 40 mbar vacuum line. The reaction extruder has a screw diameter of D=45 mm and contains a mixing unit with a diameter of 45 mm and a length of 5 D with a stator and a rotor, in which rows of semispherical grooves with a diameter of 6 mm are located along peripheral lines. In the longitudinal direction, the rows are staggered with respect to one another in such a way that they partially overlap one another between the stator and the rotor.

Per hour, 10 kg of a poly(methyl methacrylate) (PMMA) molding material (with 1 wt % of methyl acrylate units) are added to this device. At the inlet of the mixing unit, 10 g of methylamine per hour are added under pressure at a temperature of 250° C and a pressure of 100 bar into the melt by means of a metering pump. The reaction mixture is allowed to expand through the pressure regulating valve into the degassing extruder. This degassing extruder has a screw diameter of D=30 mm and a length of 30 D. The molding material that is discharged at the discharge end of the degassing extruder is glass-clear. By means of NMR analysis, a content of 7.7 wt % of dimethacryl-N-methylimide units was determined. The molding material was used to injection-mold specimens, the Vicat softening point of which measured 120° C. and which had a turbidity (haze, 23° C.) of 0.6%.

EXAMPLE 2

The process described in Example 1 is repeated with a molding material consisting of pure poly(methyl methacrylate). Per kg of molding material, 5 g of a 40% aqueous methylamine solution are added.

The molding material obtained contains 5.3 wt % of dimethacryl-N-methylimide units and has a Vicat softening point of 125° C. By means of GC analysis, a residual monomer content of 100 ppm of MMA was determined.

EXAMPLE 3

The molding material produced according to Example 2 is compounded in a single-screw extruder in a ratio of 50:50 parts by weight with a PMMA molding material (with 1 wt % of methyl acrylate units). From the mixture, specimens with a diameter of 50 mm and a thickness of 4 mm are injection-molded to determine the optical properties. The transmission measured was 91.6%, the turbidity (haze, 23° C.) was 0.9%. The (Differential Scanning Calorimetry) and resulted in one region at 125° C. only.

EXAMPLE 4

In a single-screw extruder, the molding material produced as described in Example 1 was compounded with a sufficient quantity of an agent for modifying the impact strength (emulsion polymer with a butyl acrylate core and a PMMA shell), manufactured according to German Patent DE 3,842,796, to ensure that a molding material with 14 wt % of polymerized butyl acrylate was obtained. From this molding material, specimens were injection-molded for the purpose of determining the impact strength, the dimensional stability under heat, and the optical properties.

Impact strength (ISO 180/1A) at 23° C.: 7.2 kJ/m$^2$

Vicat softening temperature (VST/B50): 108° C.
Light transmission 90.2%
Turbidity (haze, 23° C.) 1.9%.

Comparative Example

In the reaction extruder described in Example 1, the stator of the mixing unit was replaced with a smooth hollow cylinder section without cavities and the rotor was replaced with a screw unit with a diameter of 45 mm; both components had a length of 5D. The screw unit was double-threaded, and the screw flights were designed in such a way that per 1 D of pitch, 8 bars were obtained. Using the device which was modified as described above, the process according to Example 1 was repeated under the same conditions. Methylamine was introduced into the metering region of the reaction extruder.

After reacting and degassing the substance as described in Example 1, a molding material was obtained, from which the specimen was injection-molded. In this specimen, a turbidity (haze, 23° C.) of 18% was determined.

Sequential analysis of the products of Examples 1 and 5 according to the 13° C. labeling method and the signal coordination method according to E. Klesper, Pol. Bul. (sic) 2, p. 691 (1980): The product of Example 1 resulted in more intensive methyl signals, the qualitative determination of which points to a lower block formation of the glutarimide units than in the product of Example 5. Due to the well-known incompatibility of PMMA and PMMI molecules, the more pronounced block structure of the product (Example 5) leads to turbidity.

Although the present invention has been described with reference to specific detailes of certain embodiments thereof, it is not intended that such detailes should be regarded as limitations upon the scope of the invention except insofar as they are included in the accompanying claims.

What is claimed as new and is desired to be secured by Letters Patent of the United States is:

1. A process for the treatment of a plastic melt with a liquid treatment agent which comprises:

treating a plastic melt with a liquid treatment agent at a pressure and a temperature at which said treatment agent is in a liquid state, expanding and degassing said mixture at a reduced pressure;

wherein said plastic melt is divided into defined individual subquantities, and said individual subquantities are brought into contact with said treatment agent, said individual subquantities are combined after a residence time of less than one second, with portions of a minimum of one other said subquantity, wherein said steps of dividing and combining said plastic melt are repeated a plurality of times at intervals less than one second or until an intimate mixture consisting of said plastic melt and said treatment agent is obtained, and, wherein said plastic melt is comprised of a (meth-)acrylic ester homopolymer or a copolymer of (meth-)acrylic acid ester with a monomer selected from the group consisting of styrene, substituted styrene, maleic anhydride, itaconic anhydride and mixtures thereof, and wherein said treatment agent is an amine, ammonia or a mixture thereof.

2. The process of claim 1, wherein said plastic melt is subjected to pressure in an extruder and is introduced into a mixing device, said mixing device containing a stator and a rotor, and wherein said treatment agent is introduced into said mixing device at least said same pressure, and wherein an inside surface of said stator and an outside surface of said rotor are fitted with cavities for holding defined subquantities of said plastic melt, and wherein said cavities overlap for a short period of time during a rotation of said rotor in said stator, and wherein portions of said subquantities of said melt containing said treatment agent are separated from every said cavity and are exchanged between said cavities of said rotor and said stator, and wherein the separated portions are transferred into cavities that are located further downstream.

3. The process of claim 2, wherein said melt stream enters said mixing device and is subjected to $N^{2Y}$ dividing and combining steps until it exits from said mixing device, where N denotes the number of cavities in a peripheral line of said rotor or stator and Y denotes the number of rows of cavities in said rotor or stator.

4. The process of claims 2 or 3, whereby said plastic melt is divided into subquantities of 0.01 to 50 mL by entering into the cavities in said stator and said rotor.

5. The process of claims 2 or 3, whereby said plastic melt is divided into subquantities of 0.05 to 10 mL by entering into the cavities in the stator and the rotor.

6. The process as claimed in claim 1 whereby said rotor is driven by being coupled to an extruder screw.

7. The process as claimed in claim 1, whereby said mixture consisting of said melt and said treatment agent after exiting from the mixing device, is introduced into a degassing extruder where said mixture is degassed, and wherein said introduction into said degassing extruder is done under a constant pressure maintained in the range of from 50 to 400 bar in said mixing device, and wherein said pressure is regulated by a pressure regulating valve, and wherein said mixture in said degassing extruder is degassed.

8. The process as claimed in claim 1, whereby a treatment agent that is reactive with said plastic is used.

9. The process as claimed in claim 1, whereby said plastic is a polymer with lateral carboxylic ester groups.

10. The process as claimed in claim 1, whereby said treatment agent contains water.

11. The process as claimed in claim 1, whereby said plastic is poly(methyl methacrylate) and said treatment agent is a primary amine or ammonia.

12. The process as claimed in claim 1, whereby said amine is added in a quantity of 0.001 to 1.0 mole per basic mole of the methyl methacrylate units.

13. The process as claimed in claim 1, whereby said amine is added in a quantity of 0.01 to 0.1 mole per basic mole of the methyl methacrylate units.

14. The process as claimed in claim 11 or 13, whereby said amine is present in the form of a 1 wt % to 90 wt % aqueous solution.

15. The process as claimed in claim 11 or 13, whereby said amine is present in the form of a 10 wt % to 60 wt % aqueous solution.

* * * * *